(12) United States Patent
Ginzburg

(10) Patent No.: US 9,203,894 B1
(45) Date of Patent: Dec. 1, 2015

(54) METHODS AND SYSTEMS FOR BUILDING AN APPLICATION EXECUTION MAP

(75) Inventor: Ilan Ginzburg, St Pancrasse (FR)

(73) Assignee: EMC CORPORATION, Hopkinton, MA (US)

(*) Notice: Subject to any disclaimer, the term of this patent is extended or adjusted under 35 U.S.C. 154(b) by 923 days.

(21) Appl. No.: 13/245,390

(22) Filed: Sep. 26, 2011

(51) Int. Cl.
*H04L 29/08* (2006.01)

(52) U.S. Cl.
CPC .................................... *H04L 67/10* (2013.01)

(58) Field of Classification Search
CPC ............. G06F 3/0484; G06F 3/04817; G06F 17/30961; G06F 11/3006; G06F 11/3051; G06F 11/32; H04L 41/12; H04L 67/1097; H04L 43/045; H04L 67/10; H04L 67/18; G05B 2219/23178; G05B 2219/24091
USPC ........................ 715/734, 737, 853, 854, 969
See application file for complete search history.

(56) References Cited

U.S. PATENT DOCUMENTS

| | | | | |
|---|---|---|---|---|
| 5,049,873 A * | 9/1991 | Robins et al. | | 370/254 |
| 5,261,044 A * | 11/1993 | Dev et al. | | 715/855 |
| 5,276,789 A * | 1/1994 | Besaw et al. | | 345/440 |
| 5,535,403 A * | 7/1996 | Li et al. | | 715/853 |
| 5,751,965 A * | 5/1998 | Mayo et al. | | 709/224 |
| 5,793,366 A * | 8/1998 | Mano et al. | | 715/839 |
| 5,805,166 A * | 9/1998 | Hall et al. | | 715/839 |
| 5,809,265 A * | 9/1998 | Blair et al. | | 715/764 |
| 5,831,618 A * | 11/1998 | Fuji et al. | | 715/853 |
| 5,889,520 A * | 3/1999 | Glaser | | 715/853 |
| 5,910,803 A * | 6/1999 | Grau et al. | | 715/734 |
| RE36,444 E * | 12/1999 | Sanchez-Frank et al. | | 715/839 |
| 6,070,190 A * | 5/2000 | Reps et al. | | 709/224 |
| 6,526,442 B1 * | 2/2003 | Stupek et al. | | 709/224 |
| 6,832,271 B1 * | 12/2004 | Ivan et al. | | 710/15 |
| 7,886,033 B2 * | 2/2011 | Hopmann et al. | | 709/223 |
| 7,975,043 B2 * | 7/2011 | Douglas et al. | | 709/224 |
| 8,621,360 B2 * | 12/2013 | Kats et al. | | 715/734 |
| 2002/0156917 A1 * | 10/2002 | Nye | | 709/238 |
| 2003/0034998 A1 * | 2/2003 | Kodosky et al. | | 345/736 |
| 2003/0035005 A1 * | 2/2003 | Kodosky et al. | | 345/763 |
| 2003/0035006 A1 * | 2/2003 | Kodosky et al. | | 345/763 |
| 2003/0035380 A1 * | 2/2003 | Downing et al. | | 370/255 |
| 2003/0184580 A1 * | 10/2003 | Kodosky et al. | | 345/734 |
| 2004/0015340 A1 * | 1/2004 | Kadoi et al. | | 703/18 |
| 2004/0172466 A1 * | 9/2004 | Douglas et al. | | 709/224 |
| 2009/0292997 A1 * | 11/2009 | Bell et al. | | 715/738 |
| 2012/0054682 A1 * | 3/2012 | Bell et al. | | 715/817 |

* cited by examiner

*Primary Examiner* — Shen Shiau
(74) *Attorney, Agent, or Firm* — Dergosits & Noah LLP; Todd A. Noah

(57) ABSTRACT

An application execution map displays computing nodes, links, or both. The nodes represent machines which are participating in the execution of an application. The links represent communication links between the nodes. The map can be used to identify where the application is executing. In order to gather the map information, there can be monitoring agents implemented as monitoring programs installed at the nodes, network sniffers, application instrumentation, or combinations of these.

20 Claims, 9 Drawing Sheets

METHODS AND SYSTEMS FOR BUILDING AN APPLICATION EXECUTION MAP

BACKGROUND

The present invention relates to the field of information technology, including, more particularly, to systems and techniques for building a map showing where an application is executing.

Application programs have evolved from software systems running on a single computer to software systems running on multiple computers. For example, in a multi-tier or N-tier architecture, there can be an application presentation tier, an application business tier, and an application data tier. Each tier can include multiple computers, connected via a network, which execute various parts of the application. Different computers can be executing parts of the application at the same or different times.

Because of the complexity of such a distributed application, developers, system administrators, and other IT professionals may not know where an application is executing. Thus, it can be difficult to understand performance limitations or bottlenecks of the application, spot application configuration mistakes, identify the impact an application modification or downtime could have, debug an application, or understand how the application accesses its resources.

Thus, there is a need for an application execution map.

DETAILED DESCRIPTION

Figure 1:
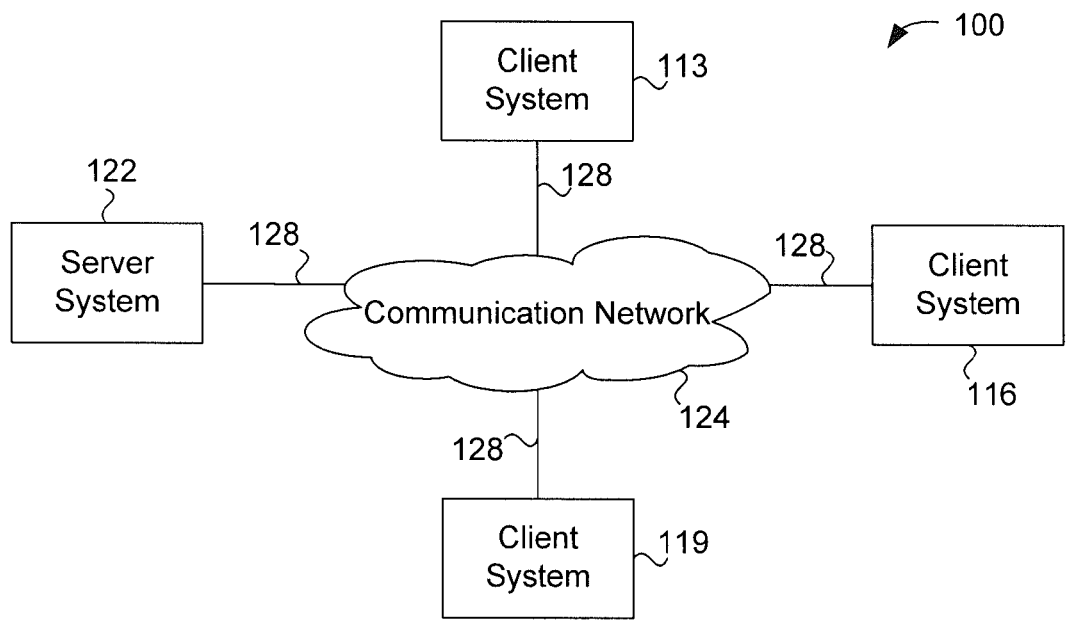
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
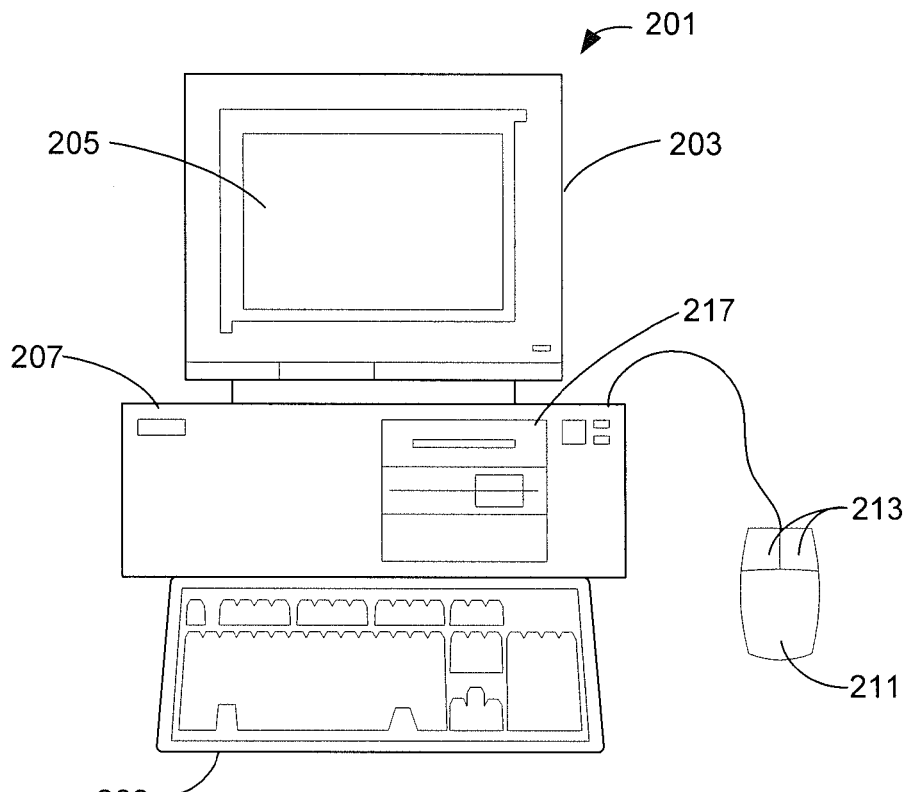
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
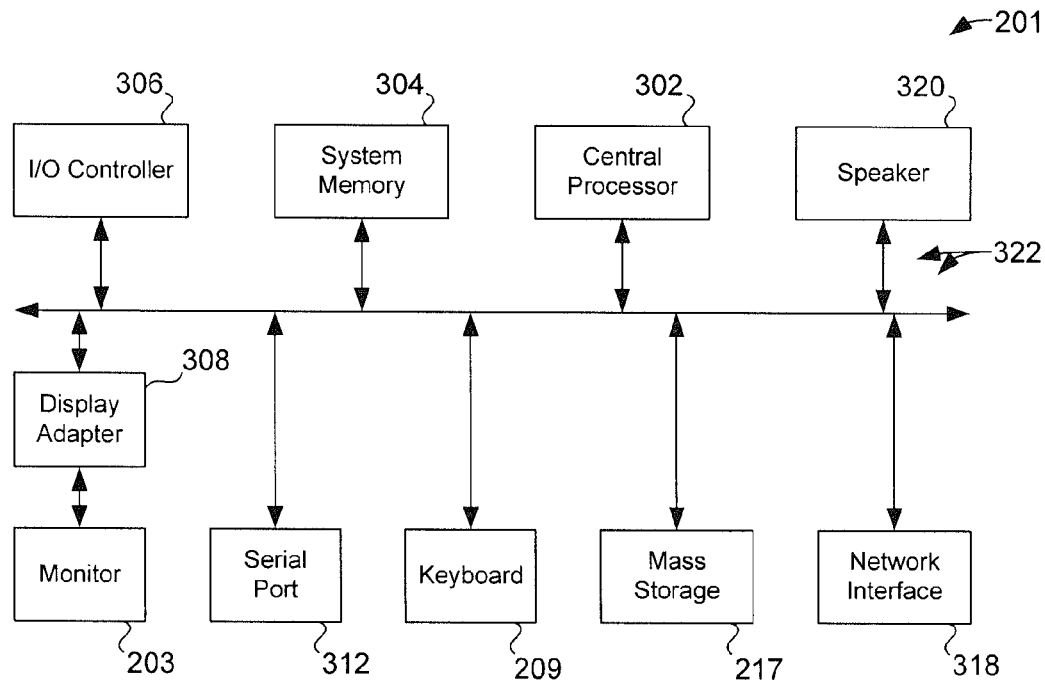
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
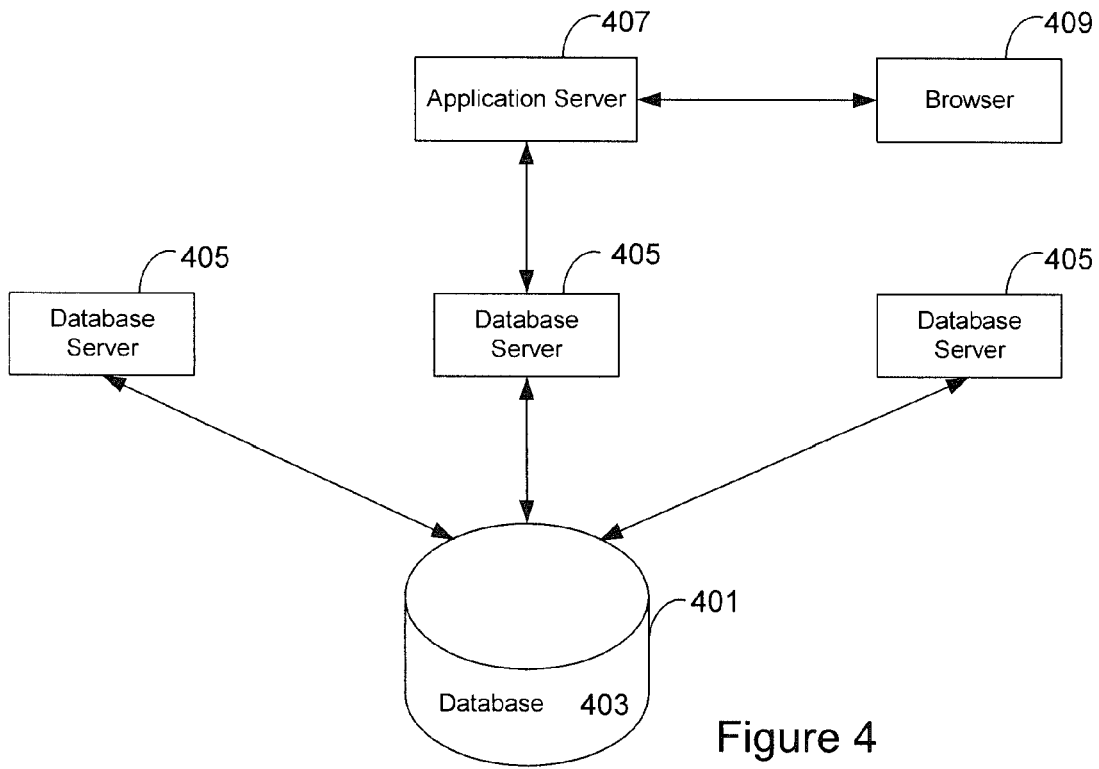
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
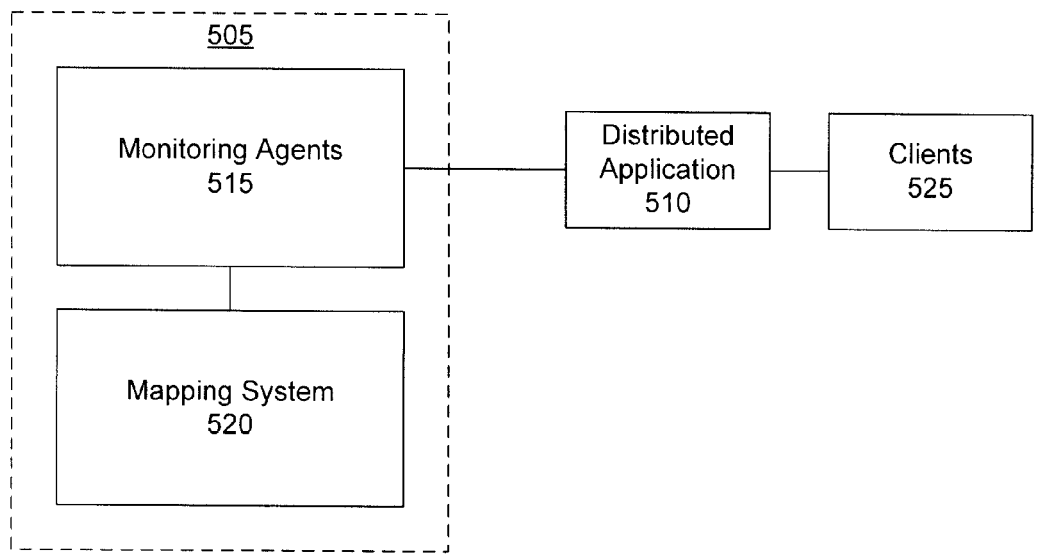
FIG. 5 shows a simplified block diagram of a system having monitoring agents to monitor application execution for building an application execution map.

FIG. 5 shows a simplified block diagram of a system 505 for mapping the execution of an application such as a distributed application 510. This system includes monitoring agents 515 and a mapping system 520. The monitoring agents monitor the distributed application and transmit the monitored data to the mapping system. The mapping system builds and displays a map showing the computing nodes that are participating in executing the application.

Generally, a modern application uses or is composed of web applications, specialized servers, databases, content servers, and so forth running on multiple physical machines, virtual machines, or both distributed across one or more data centers or in private or public clouds. Clients 525 connecting to the application may use yet another potentially large set of machines that may de facto participate in the application or execution of the application. An example of a distributed application is EMC Documentum provided by EMC Corporation of Hopkinton, Mass.

For example, typically, a distributed application utilizes the resources of multiple machines or at least multiple process spaces, by separating the application functionality into groups of tasks that can be deployed in a wide variety of configurations. In some cases, a distributed application will be divided up into three or more tiers. Components in each of these perform a specific type of processing. In a 3-tier or N-tier application, there can be a user services (presentation) tier, a business services tier, and a data services tier. Each tier may include multiple computing systems for scaling and a server load balancer may be used to balance the load across the multiple computing systems.

A feature of the invention provides a dynamic execution map of an application or distributed application. The map may include the participating machines (be they local or in the cloud), the communication links between the machines, other information (e.g., communication volumes and profile, machine load, etc), or combinations of these. In a specific implementation, the map is updated in "real time" or near real-time as machines come and go. Given that dynamism is at the foundation of cloud computing, it is generally not possible to statically provide such a map.

Having such a map has many benefits including: 1) General understanding of how an application executes; 2) Ability to understand performance limitations or bottlenecks of the application; 3) Easily spot possible application configuration mistakes; 4) Identify the impact an application modification or downtime could have; 5) Help in application debug (during development or after deployment); 6) Help with security by knowing how the application accesses resources and how it is accessed, and many other benefits.

Figure 6:
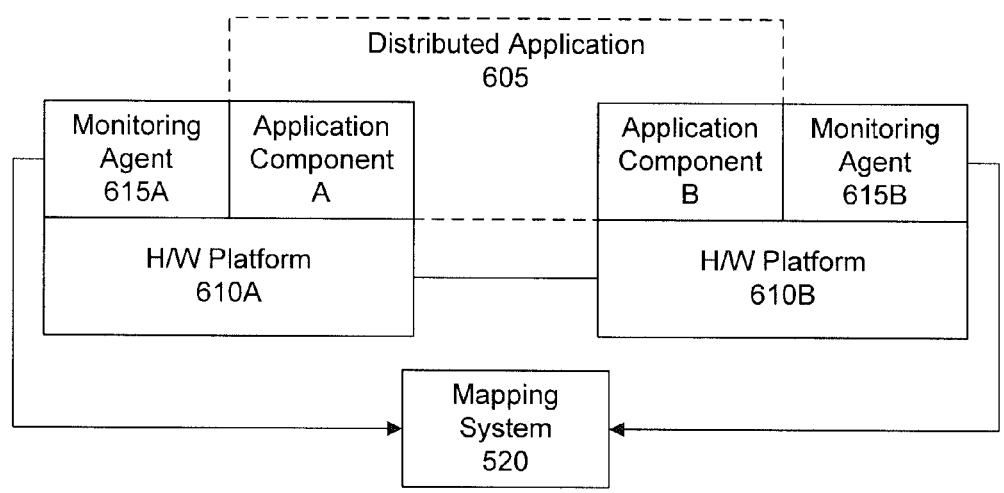
FIG. 6 shows a simplified block diagram of a first configuration of the monitoring agents.
Figure 7:
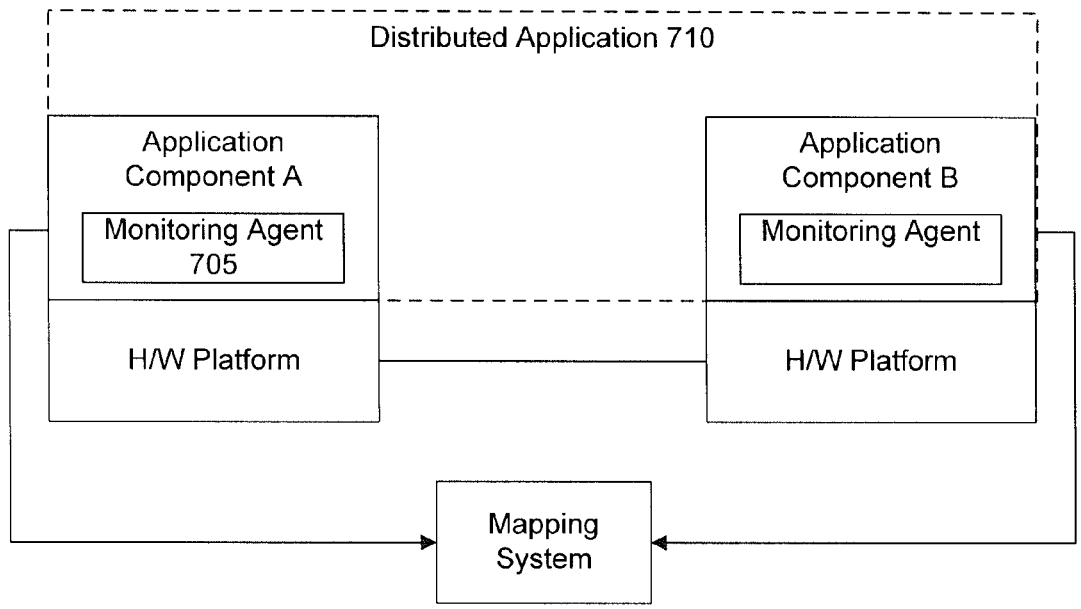
FIG. 7 shows a simplified block diagram of a second configuration of the monitoring agents.
Figure 8:
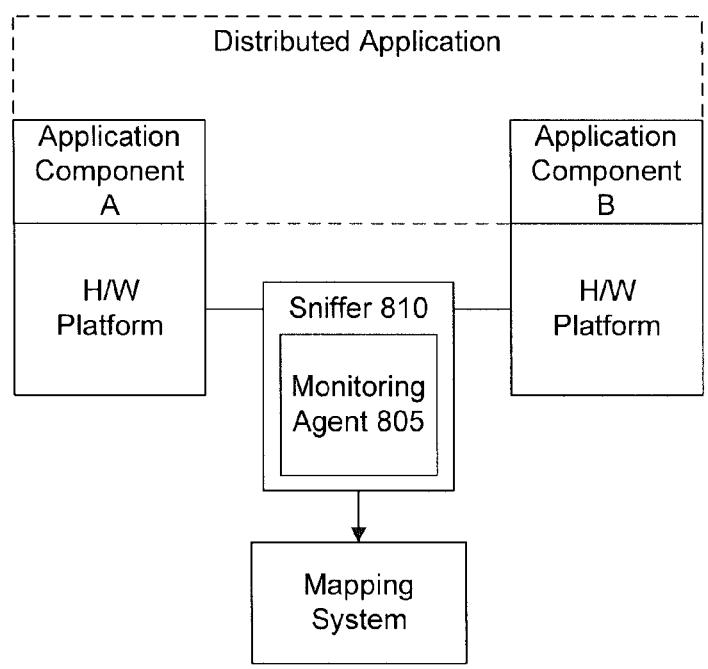
FIG. 8 shows a simplified block diagram of a third configuration of the monitoring agents.

There can be several different types of configurations for the monitoring agents. In a specific implementation, a monitoring agent is deployed, loaded, or installed onto a computing machine (e.g., server) which executes a component of the distributed application (FIG. 6). In another specific implementation, a monitoring agent is embodied as a code module that is integrated with the distributed application (FIG. 7). In another specific implementation, a monitoring agent is implemented as a sniffer or network sniffer (FIG. 8).

For example, FIG. 6 shows a block diagram of a specific implementation where monitoring agents are programs on servers on which various components of a distributed application 605 may be executing. In this example, the distributed application includes application components A and B executing on hardware platforms 610A and B. A network connects the hardware platforms. A monitoring agent 615A on hardware platform 610A monitors the execution of application component A and reports or transmits information about the execution to mapping system 520. Likewise, a monitoring agent 615B on hardware platform 610B monitors the execution of application component B and reports or transmits information about the execution to mapping system 520. The mapping system aggregates the reported information to build and display an application execution map as discussed in this application.

In this specific implementation, the monitoring agents are programs that are separate from the distributed application. For example, the distributed application may execute independently of the monitoring agents. The monitoring agents may be loaded into memory of the hardware platform before the distributed application is executed on the hardware platform. Alternatively, the monitoring agents may be installed after the distributed application is executing so that the execution can then be monitored.

FIG. 7 shows a block diagram of another specific implementation where a monitoring agent 705 is implemented as a piece of code that is integrated with a distributed application 710. That is, the monitoring agent is implemented as an integrated application module or code module within the distributed application. This configuration of the monitoring agent may be referred to as application instrumentation. The monitoring agent can be executing (integrated into the application) on each node on which the application is running. This monitoring infrastructure (the agents in cooperation with the mapping system) can be used to aggregate general application activity.

In this specific implementation, the application through the monitoring agent is designed to report on its execution state. For example, the application may include an application programming interface (API) which a monitoring service at a remote server can communicate with to determine whether or not the application is executing and where the application is executing. That is, the application may be written with a piece of code or code module to help monitor what the application is doing and report that information.

In this specific implementation, as shown in FIG. 7, there is one agent per application node. In another specific implementation, there can be a single abstract monitoring agent, where it is the application's responsibility to aggregate application data and pass it to the monitoring agent. That is, the monitoring agent could be abstractly used by the application and report global information about the application. However, having one agent per application node may be simpler for the application developer to integrate.

FIG. 8 shows a block diagram of another specific implementation where a monitoring agent 805 is implemented as or within a sniffer or network sniffer 810. The sniffer may be used for detecting communication links. A sniffer may be implemented as hardware, software, or a combination of hardware and software. The sniffer can analyze traffic flowing into and out of a computer system. As data streams flow across the network, the sniffer can capture each packet and decode the packet's raw data to determine the values of various fields in the packet. The sniffer can report on network activities related to the application being monitored.

It should be appreciated that the monitoring agent configurations shown in FIGS. 6-8 may be implemented in any combination. For example, in various specific embodiments, monitoring agents are configured as shown in FIGS. 6 and 7. Monitoring agents are configured as shown in FIGS. 6 and 8. Monitoring agents are configured as shown in FIGS. 7 and 8.

Figure 9:
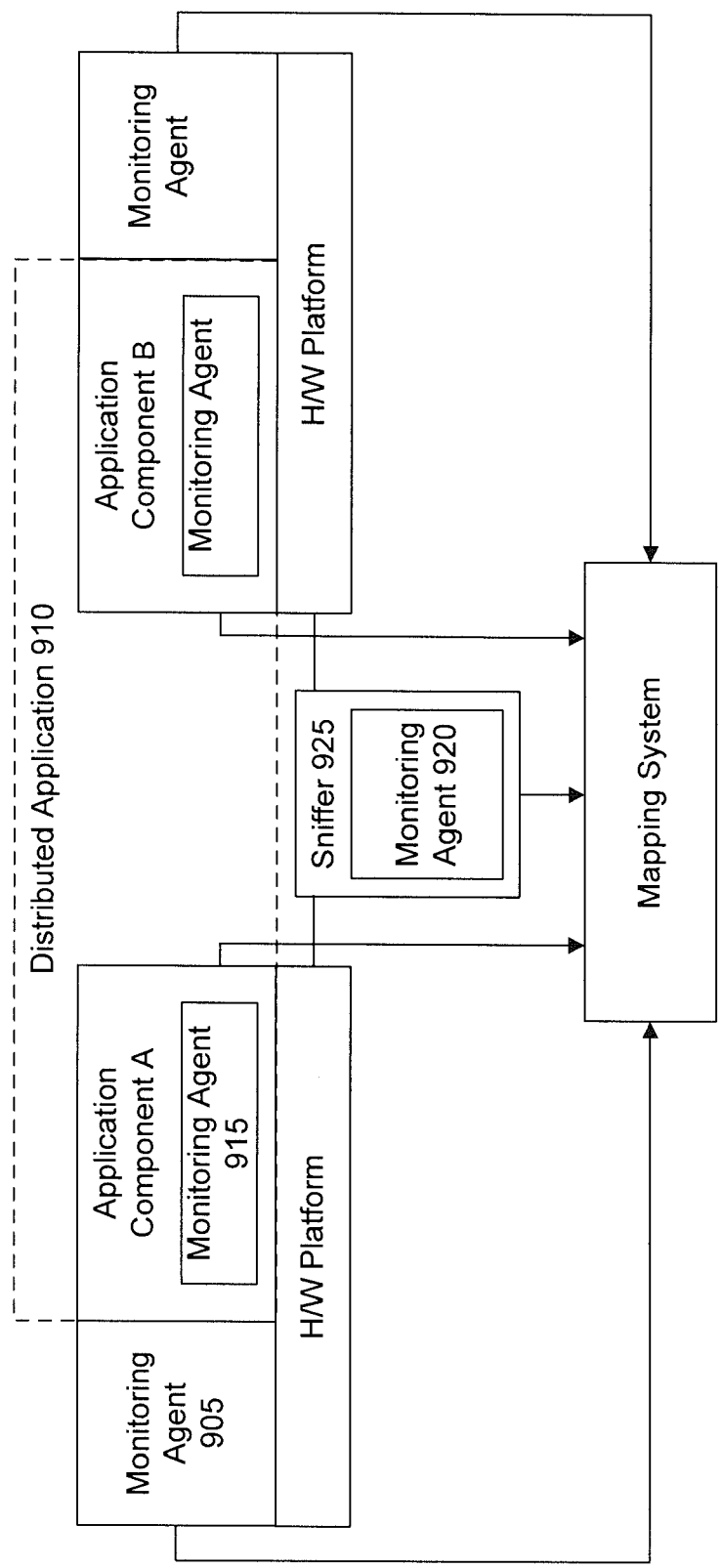
FIG. 9 shows a simplified block diagram of a fourth configuration of the monitoring agents.

FIG. 9 shows a block diagram of another specific implementation of a monitoring agent configuration. In this specific implementation, a monitoring agent 905 is configured as an application program that is separate from a distributed application 910. A monitoring agent 915 is configured as integrated with the distributed application. And, a monitoring agent 920 is configured as a sniffer 925.

The various monitoring agent configurations shown in FIGS. 6-9 and discussed above are designed to address the different scenarios or environments in which a system for building an application execution map may be implemented. Generally, application instrumentation is desirable to monitor an application when the application code is controlled, as the instrumentation will work in most or all environments (no requirements from the hosting infrastructure). Application instrumentation, however, may be difficult if the application is provided by a third party and does not include provisions for instrumentation (e.g., legacy code).

Network sniffing or a separate monitoring agent installed on a machine can be provided on an execution environment (for example by a cloud provider) without having to impose any constraint on the executing applications. Network sniffing, however, may be difficult on non-diffusion networks. For example a node in a virtual private network (VPN) usually cannot see the network traffic of other nodes, while a node on an Ethernet cable can see the traffic of the neighbors. Network sniffing may be difficult if there are insufficient access rights on a machine which may prevent the sniffer or monitoring agent from looking at network activity of other nodes. In some environments or separate running processes, it may be difficult to install a monitoring agent as a separate program on a machine.

Thus, there can be mixed scenarios or monitoring agent configurations depending on the environment. Consider the example of a web server calling a business tier application. The application might have been instrumented, but the web server not, and a network sniffer on the web server machine could provide additional information (such as the identity of clients connecting to the web server that then connects to the application).

Figure 10:
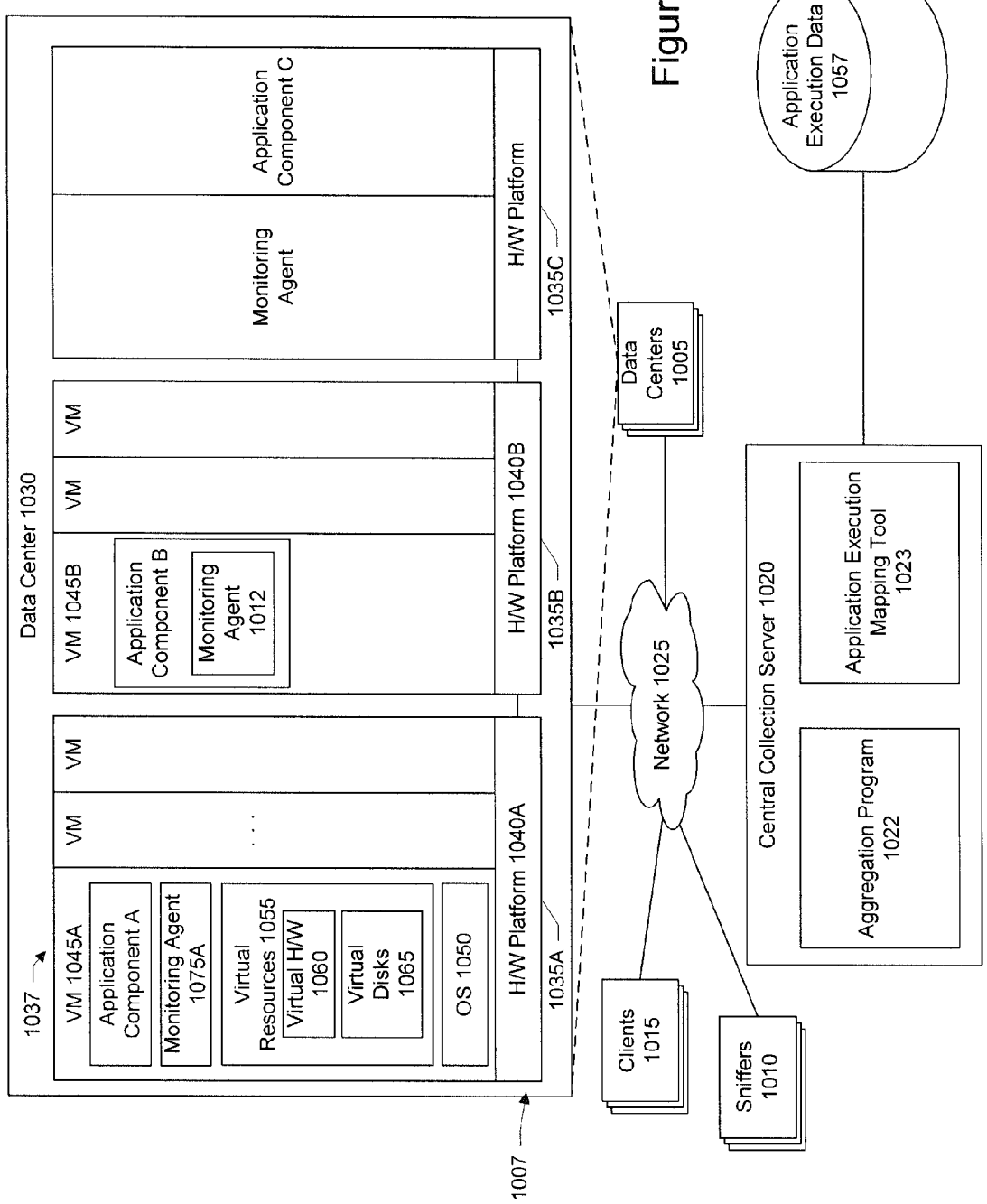
FIG. 10 shows a more detailed block diagram of the system shown in FIG. 5.

FIG. 10 shows a more detailed block diagram of the system shown in FIG. 5. In the example of FIG. 10 there are a set of data centers 1005 having network computing systems 1007 on which a distributed application may be executed. There can be monitoring agents configured as an application program separate from the distributed application (e.g., monitoring agent 1075A), configured as network sniffers 1010, configured as integrated code modules 1012 with the distributed application, or combinations of these. There may be clients 1015 and a central collection server 1020. The central collection server includes an aggregation program 1022 and an application execution mapping tool 1023 of the mapping system. A database 1057 for storing application execution data collected by the various monitoring agents is coupled to the central collection server. A network 1025 is coupled between the data centers, clients, and central collection server.

A data center is a facility used to house computer systems. A data center can occupy one room of a building, one or more floors, or an entire building. A data center may be remote from another data center. For example, a distance between two data centers may range from about several hundred meters to many thousands of kilometers. A data center, such as a data center 1030, may include any number of network computer systems such as servers which are typically mounted in rack cabinets. In the example shown in FIG. 10, data center 1030 includes network computer systems 1035A-C.

The computer system, such as computer system 1035A, includes a physical hardware platform 1040A having one or more components such as that shown in FIGS. 2-3. For example, the hardware platform may include a user interface, one or more processors, a network interface, mass storage, and memory. Alternatively, some embodiments may not include the user interface or the user interface may not be connected directly to the hardware platform. For example, user interaction may be automated or occur remotely.

A computer system may (or may not) be configured with a set of virtual machines 1037. In this example, computer system 1035A includes a virtual machine 1045A which provides an environment for hosting applications. A virtual machine (VM) is a software implementation of a physical machine (i.e., a computer) that executes programs like a physical machine. A virtual machine is a software abstraction of a physical computer system that is installed as a "guest" on the "host" hardware platform. The virtual machine can include a guest operating system 1050, guest applications running on the guest operating system, and virtual resources 1055 including virtual hardware 1060 and virtual disks 1065. The virtual resources refer to the resources allocated to the virtual machine and are mapped to the hardware platform. The virtual resources may further include virtual processors, virtual system memory, and various virtual devices.

More particularly, a distributed application may include any number of application components such as first, second, and third application components A, B, and C, respectively. In this example, first application component A of the distributed application is executing on machine or virtual machine 1045A. Second application component B is executing on a different machine or virtual machine 1045B. Third application component C is executing on a machine 1035C that does not include a virtual machine. The application components may be executing simultaneously or concurrently on the respective machines. A physical or virtual machine that is executing an application or component of an application may be referred to as a participating machine or node.

In the example shown in FIG. 10, virtual machines 1045A and 1045b, and physical machine 1035C on which the first, second, and third application components are executing, respectively, are on separate computer systems in the same data center. It should be appreciated, however, that FIG. 10 is merely one example of how a distributed application may be executing. Components, portions, modules, subsystems, processes, or parts of a distributed application may be executing on different virtual machines on the same computing system or hardware platform, different physical machines in the same or different data center, and so forth. One component of a distributed application may be executing on a virtual machine and another component of the distributed application may be executing on a physical machine or not within a virtual machine. One component of a distributed application may be executing within one data center and another component of the distributed application may be executing within another data center, remote from the one data center.

One or more clients 1015 may be connected to the one or more machines which are executing the distributed application. For example, a client may be sending requests (e.g., HTTP requests) for content and presenting the responses provided by the application system to a user. Such a client machine may also be referred to as a participating node.

In a specific implementation, a dynamic execution map is built using information collected from network sniffers or network sniffing for detecting communication links (one sniffer per shared medium may be sufficient), a network monitoring agent on participating machines, application programming interface (API) and explicit application integration, log monitoring and data extraction, and the like, or combinations of these. For example, a specific embodiment may include monitoring agents, network sniffers, and application code modules inserted into the application to monitor application execution. Another specific embodiment may include monitoring agents, but not network sniffers, application code modules, or both. Another specific embodiment may include network sniffers, but not monitoring agents, application code modules, or both. Another specific embodiment may include application code modules, but not monitoring agents, network sniffers, or both.

It should be appreciated that it is not necessary for all machines to be instrumented. For example, a server receiving a connection from a client can have the client added to the application map. The client is not impacted. There can be an information collection mechanism to centralize the collected raw data. In a specific implementation, the mechanism is implemented through a distributed logging framework.

A monitoring agent 1075A can be distributed and installed on computer system 1035A to detect when an application or a component of the application is executing. In a specific implementation, as shown in FIG. 10, virtual machine 1045A has been provisioned with monitoring agent 1075A. In another specific implementation, computer system 1035A is provisioned with a single instance of the monitoring agent where the agent is outside of the VM. The monitoring agent can identify on which virtual machine of computer system 1035A that application component A is executing. Because such an agent is outside the VM, the agent may be collecting information similar to that of the sniffing monitoring agent such as network traffic. Instead or additionally, through an API or other collaboration with the VM vendor, the monitoring agent may discover application execution activities within the VM.

The monitoring agent may run as a background application or process. The monitoring agent may use any technique or combination of techniques to detect when an application is executing. For example, the monitoring agent may monitor log directories expected to be used by the application when the application is executing, check if a process having a name of the application executable is running, check the output of the operating system's task list to see if it contains the application process name, and so forth.

The example of FIG. 10 further shows a monitoring agent 1012 configured as a code module that is integrated with the distributed application, and a monitoring agent embodied as a network sniffer.

In this specific implementation, mapping system 520 (FIG. 5) includes collection server 1020, aggregation program 1022, mapping tool 1023, and a database 1057 to store data about application execution. Aggregation program 1022 at central collection server 1020 is responsible for aggregating the application execution data collected from the monitoring agents (e.g., monitoring agent programs, sniffers, and application code modules integrated with the application). The collected application data may be stored in database 1057. Database 1057 may be a disk based database or an in memory database. An in memory database may be better suited to changing dynamic data.

Application execution mapping tool 1023 retrieves the application data stored in the monitoring database and uses the information to build a map showing machines or nodes that are participating in executing the application. In a specific implementation, the map includes the communication links between the nodes, additional information (e.g., communication volumes and profile, machine load, etc.), or both. FIGS. 12-19 show some examples of application execution maps that may be created by the application execution mapping tool to show nodes or the location of nodes that are participating in execution of the distributed application.

Figure 11:
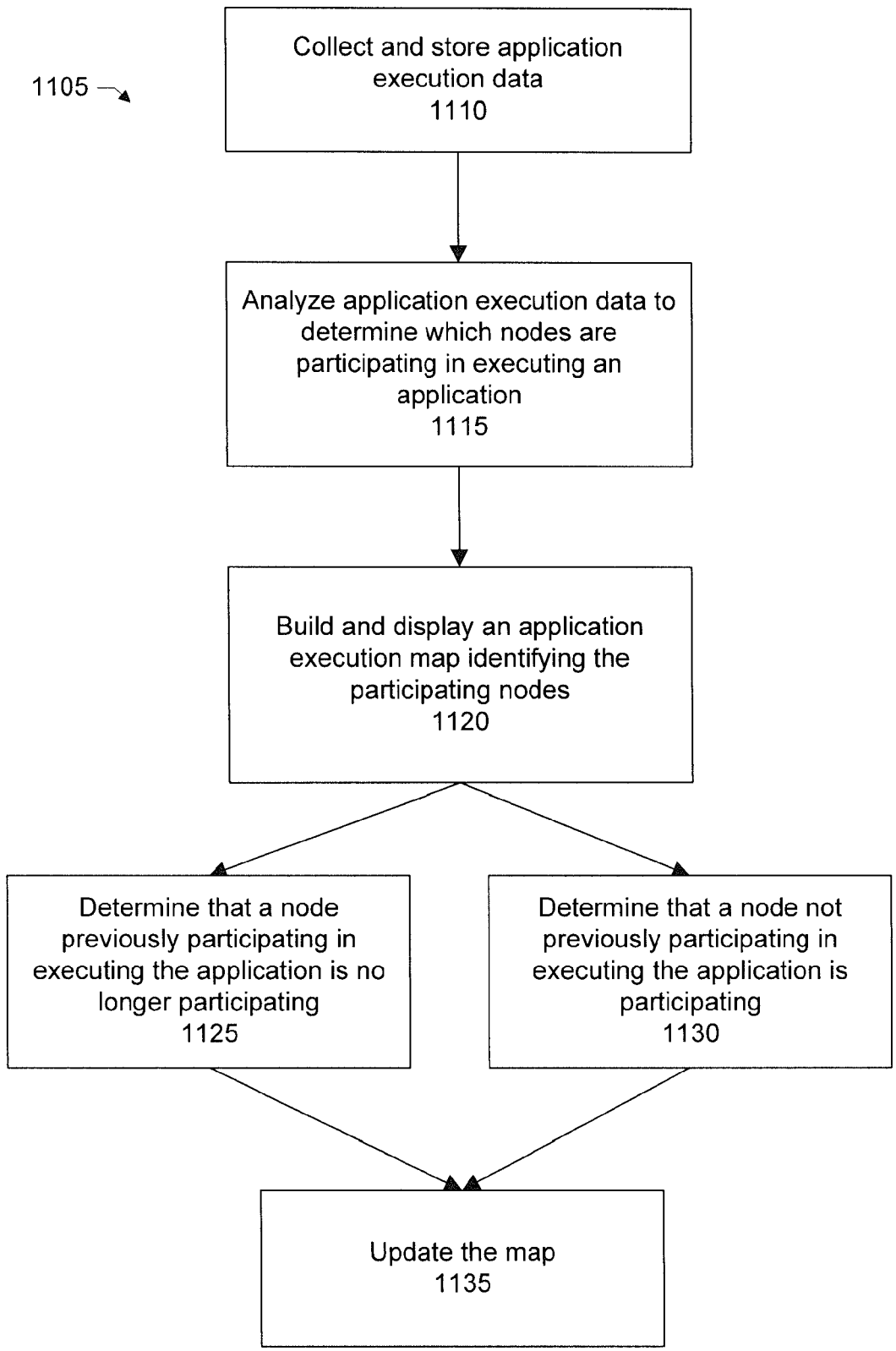
FIG. 11 shows a flow for building an application execution map.

FIG. 11 shows an overall flow diagram 1105 for building an application execution map. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in a step 1110, application execution data identifying or indicating nodes participating in executing the application is collected from the various monitoring agents and stored. In a step 1115, the application execution mapping tool analyzes the stored application execution data to determine which nodes are participating in execution of the application. In a step 1120, the tool builds and displays a map showing the participating nodes. In steps 1125 and 1130, the tool may determine that a node previously participating in executing the application is no longer participating in executing the application, determine that a new node or a node not previously participating in executing the application is now participating in executing the application, or both. In a step 1135, based on the determination, the tool updates the map.

In a specific implementation, the monitoring agents (e.g., monitoring agent programs, sniffers or integrated application modules) are explicitly told what they monitor (e.g., what is the application they are looking at, in addition of what to monitor on the system) and they can serve as "anchors" for the map. In other words, in a specific implementation, a monitoring agent receives a first instruction and a second instruction. The first instruction identifies one or more specific applications to be monitored. The second instruction identifies events, processes, or operations related to the specific application that should be monitored.

For example, referring to FIG. 10, there can be monitoring agents 1075A, 1010 (sniffers), an explicit code fragment 1012 included as part of the application, or combinations of these that are each told that they are monitoring a specific application (a single or different applications). Then, using the data sent back to the collection server 1020 by these specifically configured and other agents, a map or multiple maps can be built by following all the links detected by the various agents and creating a graph of participating nodes. In a specific implementation, a transitive closure is used to create the map. Care is taken to not merge all applications into a single big application if a shared resource such as a database system is used by multiple applications. The graph is assigned to be the execution graph of the application or applications that are explicitly configured for some of the agents. For example, if the transitive closure contains somewhere an explicit sniffer configuration for application A, then it is a map for application A. If it contains both explicit configuration for application A and B, then it is a map for both.

In step 1110 of the flow, aggregation program 1022 (FIG. 10) aggregates, collects and stores application execution data. In a specific implementation, the application execution data is collected on a periodic basis such as at a specified time or at specified time intervals. The monitoring agent programs, sniffers, integrated application code modules, or combinations of these may be configured to automatically report or transmit application status information at a regular time or time interval to the central collection server. This allows the mapping tool to quickly build, on-demand, the application execution map because the data used to build the map will have already been previously collected and stored at the server. For example, when the mapping tool receives a request, such as from a user, for the application execution map to be displayed the map can be quickly constructed because there is no need to wait for the application execution data from the various nodes to traverse the network.

The time interval at which application execution data is collected can range from about 1 second to about 30 seconds, from about 1 minute to about 30 minutes, from about 1 hour to about 6 hours, or from about 12 hours to about 24 hours. For example, application execution data may be collected once every 30 seconds, once every 30 minutes, or once every hour. More frequent collections can provide a more accurate "real-time" map of where the application is executing. However, frequent transmissions of collected application execution data may potentially clog the network. So, generally, the frequency of collections, frequency of transmissions, or both will be based on factors such as desired mapping accuracy, available network bandwidth, and the like. An agent may collect at a high frequency (say machine load every minute) but send to the collection server at a lower frequency (every 10 minutes send the last 10 load measures). Having data collected frequently, but transmitted less frequently can provide a balance or compromise between having an accurate application execution map and helping to prevent network congestion.

As an example, in order to help conserve network resources, a monitoring agent may be configured to report application execution status when the agent detects that the application is executing and not report status when the application is not executing. Alternatively, the agent may be configured to report status even if the application is not executing. Receiving an actual confirmation that an application is not executing can help to ensure that the application execution map is accurately drawn.

In another specific implementation, the application execution data is collected on an as-needed basis. For example, the mapping tool, in response to a user request to display the map, can send a request to the various monitoring agents to report application execution data. The displayed application execution map may include a refresh button that the user can click to refresh the map.

Agents may use an aggregated technique for reporting their states (report to a local node that aggregates local messages then sends them to the main collection server or to another higher level aggregator). This can be useful for large networks to help prevent too high of a load on the collection server and for security reasons where some nodes do not directly have access to the "outside" world and need to explicitly pass through some form of gateway.

Some specific examples of the type of application execution data that may be collected and stored in database 1045 (FIG. 10) include a machine or node identifier such as an address or Internet Protocol (IP) address of the node participating in executing the application, a timestamp indicating when the data was received, the type of network or communication link used or connected to the node (e.g., personal area network (PAN), local area network (LAN), wide area network (WAN), communication protocol, and the like), bandwidth usage, resource usage, or combinations of these. Resource usage may include resources used by the executing application such as CPU usage, memory usage, disk space usage, communication volumes and profile, machine load, and the like.

The collected data may include computer or node configuration information collected by a monitoring agent such as processor speed, processor details (e.g., processor manufacturer), memory capacity and memory details (e.g., type of RAM, available RAM), total disk space, free disk space, operating system, other applications that may be installed at the node, other applications at the node that are executing, and the like.

In a specific implementation, monitoring agents report the connections between nodes participating in the application, so an agent can report the couples of nodes that are communicating (if the agent is bound to a specific node then the list of couples amounts to a list of external nodes with which the agent application node is communicating). The basic data for building the map can be extended with network throughput/usage or latency. For explicit agents (i.e., code added into the application or code executing on a node, but not network sniffing), it is possible to report any value (key/value pairs) desired by the application developer (accessible either in the application process or on the system where the agent is executing).

The central collection server 1020 (FIG. 10) may aggregate values reported by multiple agents. The collected data may include several different data types. In a specific implementation, the basic collected data include node names or IP addresses which can be of a "graph" nature, and aggregating them includes building a map. Some numerical values, such as quantity of resources consumed, for example size of files stored, could be aggregated by adding them. Care is taken to report each consumed resource only once. Other data, such as security certificates or login credentials may be aggregated, where aggregation includes eliminating non-unique values in order to get a list of unique security certificated/login credentials used by the application. As discussed, machine load and other data could be reported as well.

Further, the "machine load" type of value may be aggregated, because application code may be moving around nodes and being executed in different places at different times (cloud computing), and the possibility of multiple agents reporting a given value is anticipated and dealt with correctly. For example, it can be desirable to add loads of different machines to get the total load, but it is generally not desirable to add the load of a given machine multiple times.

Depending on the communication protocols and desired information to be reported, an agent may check if the network connection with the given node is still open even if no data is exchanged.

In step 1115, the mapping tool analyzes the collected application execution data to determine which nodes are participating in executing the application, identify the communication links between the nodes, or both. For example, the mapping tool may scan application execution database 545 to identify those nodes that are participating in executing the application. As an example, consider Table A below which shows some of the information that may be collected and stored application execution database 545.

TABLE A

| Node Address | Time |
| --- | --- |
| 64.233.161.18 | 3:02 p.m. |
| 66.102.1.44 | 1:22 p.m. |
| 72.14.203.91 | 3:04 p.m. |
| 209.85.129.18 | 3:01 p.m. |
| 216.239.37.19 | 2:46 p.m. |

Table A includes columns Node Address and Time. The Node Address column lists the IP address associated with the node. In this example, a monitoring agent at a node detects when the application is executing. Upon detecting the execution, the monitoring agent reports or transmits an IP address associated with the node to the central collection server. The Time column lists the time at which the server received the IP address from the reporting node. Alternatively, the time can be the time at which the monitoring agent detected the application execution.

In a specific implementation, to determine whether or not a node is currently participating in executing the application, the tool compares the time with a current time. The tool may calculate a difference or absolute difference between the time and the current time. If the difference is within a pre-determined duration or threshold time or time window, the tool determines that the reporting node is participating in executing the application. For example, the difference may be less than the threshold duration. The difference may be less than or equal to the threshold duration. If the difference is outside the threshold duration the tool determines that the reporting node is not participating in executing the application. For example, the difference may be greater than the threshold duration. The difference may be greater than or equal to the threshold duration.

For example, assume the current time is 3:05 p.m. and the threshold time is 5 minutes. For first reporting node listed in row one of Table A above, this results in a difference of 3 minutes (i.e., 3:05 p.m.−3:02 p.m.=3 minutes). The difference (3 minutes) is less than the threshold time (5 minutes). Thus, the first reporting node having the IP address "64.233.161.18" is determined to be a participating node.

For second reporting node listed in row two of Table A above, a difference between the time (1:22 p.m.) and current time (3:05 p.m.) is 1 hour and 43 minutes or 103 minutes (i.e., 1:22 p.m.−3:05 p.m.=103 minutes). The difference (103 minutes) is greater than the threshold time (5 minutes). So, the tool determines that the second reporting node having the IP address "66.102.1.44" is not a participating node.

Thus, in this example, first, third, and fourth reporting nodes having the IP addresses "64.233.161.18," "72.14.203.91," and "209.85.129.18," respectively, are determined to be participating nodes. Second and fifth reporting nodes having the IP addresses "66.102.1.44" and "216.239.37.19," respectively, are determined to be non-participating nodes.

A collection node or server may estimate the difference between each node's time and its reference time. On a large distributed application each node might have a different time setting (e.g., wrong time set, wrong or different time zone and combinations of these). Relying on data reception time might not be sufficient, especially in the context of data aggregators and forwarding as discussed above.

A monitoring agent, such as a monitoring agent program on a server or reporting node, may be configured to report the time zone associated with the reporting node. This allows the collection node to account for a reporting node being in a different time zone than the collection node. Thus, the collection node can make the appropriate time adjustments when determining whether the reporting node is a participating or non-participating node.

However, as discussed, a reporting node may have been configured with the wrong time or the time set at a reporting node may not be according to the Coordinated Universal Time (UTC). Thus, in a specific implementation, the system estimates the difference between actual time (the time at the collection server) and the time set on the node. That is, the collection node estimates the skew in clock settings at remote nodes (for all nodes).

In step 1120, the mapping tool builds and displays a map identifying the location of the participating nodes. In a specific implementation, the map may further display the communication links between the participating nodes, other information such as resource usage information, or both.

In a specific implementation, identifying which nodes are currently participating in an application is left as a user configuration in the mapping tool 1023. In this specific implementation, the user selects the duration a node is still considered active after it has communicated with another application node. As discussed above, checking the status of the network connection can be used even when no network activity is detected. The time threshold for a node to be considered as part of the application can also depend on past history of the node. If a node has been often participating in the application (many communications detected in the past), its threshold can be increased as it is assumed it is most likely still participating though temporarily inactive. All these considerations can be combined with an "ageing" factor so the influence of a past event on the present diminishes as the time from the event increases.

Thus, factors or attributes that may be used to determine whether a node is currently participating or not participating in executing an application may be based on time, the frequency of past participation, the frequency of recent past participation, or combinations of these. A factor may be weighted. For example, more recent participation may be weighted more heavily than less recent participation.

In a specific implementation, a method to determine whether a node is participating in executing an application includes receiving a transmission from the node, the transmission being associated with a time. The time may be included with the transmission and may be the time of transmission from the node. Alternatively, the time may be the time the transmission is received. The method further includes calculating a difference between the time and a reference or current time. Comparing the difference with a user-configurable threshold duration. If the difference is less than the user-configurable threshold duration, determining that the node is participating in executing the application. If the difference is greater than the user-configurable threshold duration, determining that the node is not participating in executing the application.

In another specific implementation, a method includes receiving first and second transmissions from first and second nodes, respectively. The first transmission is associated with a first time. The second transmission is associated with a second time. The method further includes calculating a first difference between the first time and a reference time. Comparing the first difference with a first threshold duration. If the first difference is less than the first threshold duration, determining that the first node is participating in executing the application. Calculating a second difference between the second time and the reference time. If the second difference is less than a second threshold duration, determining that the second node is participating in executing the application. The first threshold duration may be different from the second threshold duration. If the first node has participated in executing the application a greater number of times than the second node, the first threshold duration is greater than the second threshold duration. If the first node has participated in executing the application a fewer number of times than the second node, the first threshold duration is less than the second threshold duration.

In another specific implementation, a method to determine whether a node is currently participating in executing an application includes weighting one or more factors. A first factor is associated with receiving a transmission from the node, the transmission being associated with a time. A second factor is associated with a first frequency indicating a number of times the node previously participated in executing the application during a first time period. A third factor is associated with a second frequency indicating a number of times the node previously participated in executing the application during a second time period. A beginning time of the second time period is more recent than a beginning time of the first time period. In other words, the beginning time of the second time period is closer to a current time than the beginning time of the first time period. In this specific implementation, the third factor is weighted more heavily than the second factor to indicate that greater weight is given to more recent application execution participation as compared to less recent application execution participation. The first factor may be weighted more or less than the second factor, third factor, or both.

In another specific implementation, determining "last time of activity" or similar reported by a node may include two separate determinations. A first determination may include determining the mapping into "current time" (i.e., time of the collection server) of a timestamp generated by a remote node. In other words, computing the time difference in order to express any timestamp in "collection server time." A second determination may include determining based on "current time timestamps" if a node does belong or not to the application. The second determination may include a confidence evaluation applied to current time timestamps and may include ageing functions or other heuristics. The first determination may be solved in a more deterministic way, by estimating the time delta between nodes (repeatedly, as time set on nodes can change at any time). The error margin on the first determination may be combined into the heuristics of the second determination.

In another specific implementation, a geographic location of the participating node is determined based on the IP address of the participating node. For example, the mapping tool may use the IP address of the participating node to perform a look-up or a cross-reference against a location database listing IP addresses of computers and their known corresponding geographical locations. A geographical location may include information such as country, region, city, latitude, longitude, ZIP code, area code, county, state, time zone, street or postal address (e.g., address of the data center housing the computing node), or combinations of these.

The location database may be supplied by an external third-party. For example, the external third-party may provide an API that takes as input an IP address submitted by the mapping tool and returns to the mapping tool a geographical location. The system can store the geographical location so that the location can be available for future use. Geolocation for IP addresses can be available for public IP addresses.

Alternatively, the location database may be internal to the system. For example, in a private cloud implementation, a company may have a location database which stores a list of the company's host computer IP addresses and corresponding geographical locations.

Once the geographical location of the participating node is obtained from the location database, the application execution mapping tool can plot the location on a map and display the map on an electronic screen to a user.

In a specific implementation, the map is updated in real-time or near real-time as nodes stop or start participating in executing the application. More particularly, in step 1125, the application execution mapping tool determines that a node previously participating in executing the application is no longer participating in executing the application. For example, for a previous time period the node may have been participating in executing the application. However, for a current time period or a subsequent time period, i.e., a time period after the previous time period, a determination is made that the node is not participating in executing the application. The determination may be based on receiving information from the monitoring agent associated with the node indicating that the node is not participating in executing the application.

Alternatively, the determination may be made based on not having received information from the monitoring agent associated with the node. For example, as discussed above, a monitoring agent may be configured to report if application execution is detected and to not report if application execution is not detected. Thus, in this specific implementation, not having received information from the monitoring agent would indicate that the node is not participating in executing the application.

In step 1135 the system updates the map. In a specific implementation, updating the map includes removing the non-participating node from the map. In other words, the non-participating node is not visible on the updated map. That is, the non-participating node is omitted from the updated map. Thus, in this specific implementation, the map shows participating nodes and non-participating nodes are not shown, are omitted, are hidden, or are not visible.

Omitting the non-participating nodes from the map can help to reduce clutter. For example, in some cases, there may be many nodes which can potentially participate in executing the application. Further, some of these nodes may be geographically very close to each other such as in the same data center. Thus, when the map is displayed non-participating nodes may be overlapping with participating nodes which can make it difficult to distinguish between non-participating nodes and participating nodes. Distinguishing among the different nodes can be especially difficult if the display screen is small or has a low resolution such as a smartphone or tablet screen.

In another specific implementation, updating the map includes changing a visual indicator associated with the node to indicate that the node is not participating in executing the application. In other words, the non-participating node is visible on the updated map, but there is a visual indicator associated with the node to indicate that the node is not participating in executing the application. The visual indicator may be implemented as a shape (e.g., circle or square), icon, color (e.g., red or green), or combinations of these.

Thus, for example, on the updated map a red indicator adjacent to the node may indicate that the node is not participating in executing the application. A green indicator may indicate that the node is participating in executing the application.

A benefit of displaying both participating nodes and non-participating nodes is that it can give the user a complete picture of the nodes where the application could potentially be executing and the resources or other nodes that are potentially available for executing the application. This can be of assistance in, for example, load balancing, resource provisioning, and so forth.

In step 1130, tool determines that a node not previously participating in executing the application is now participating in executing the application. The node may be referred to a new node. For example, for a previous time period the node may have not been participating in executing the application. However, for the current or subsequent time period, a determination is made that the node is participating in executing the application. For example, the determination may be made based on receiving information from the monitoring agent associated with the node indicating that the node is participating in executing the application.

In step 1135 the system updates the map. In a specific implementation, updating the map includes adding the now participating node or new node to the map. In other words, the new node may not have been visible on the previous map, but is visible on the updated map. In another specific implementation, updating the map includes changing a visual indicator associated with the node to indicate that the node is now participating in executing the application. In this specific implementation, the node is visible on both the previous map and the current or updated map. However, for the previous map, the visual indicator associated with the node indicates that the node is not participating in executing the application. For the current or updated map, the visual indicator indicates that the node is participating in executing the application. For example, for the previous map, a visual indicator may be displayed in the color red to indicate that the node is not participating in executing the application. For the current or updated map, the visual indicator may be displayed in the color green to indicate that the node is participating in executing the application.

Figure 12:
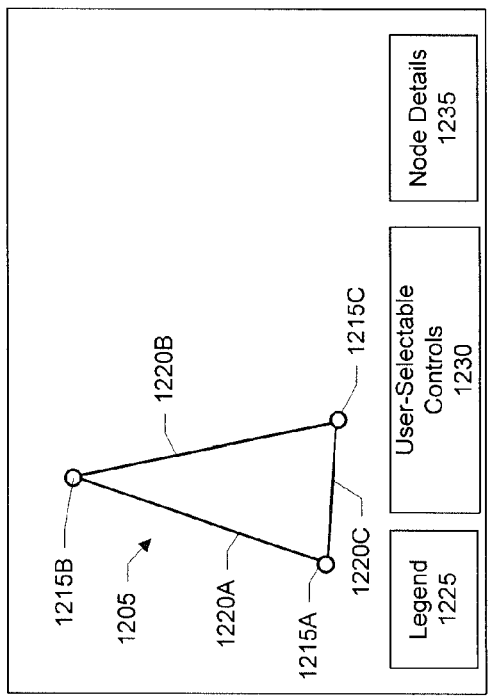
FIG. 12 shows a graphical user interface displaying an embodiment of an application execution map.

FIGS. 12-19 show some examples of application execution maps that may be generated by the system and displayed on an electronic screen. FIG. 12 shows a view of an application map 1205. The execution map includes icons or symbols to represent first, second, and third nodes 1215A, B, and C, respectively, and first, second, and third communication links 1220A, B, and C, respectively, between the nodes. The map may further include a legend 1225, user controls 1230, node details section 1235, or combinations of these.

In this example, the nodes represent the machines that are participating in executing the application. A participating node may include a server machine that is hosting or executing a component of the application or a client machine that is communicating with the server machine.

As shown in FIG. 12, the nodes are represented graphically as circles. It should be appreciated, however, that other icons, graphical objects, or shapes may instead be used such as squares, triangles, rectangles, stars, and so forth. Further, the map may include different icons or shapes. For example, an icon of a first type (e.g., circle) may represent a server that is hosting an application component. An icon of a second type (e.g., square), different from the first type, may represent a client computer that is making a request to the server, where the client computer does not have a monitoring agent installed. The communication links are represented as lines or bars extending from one node to another node. Displaying the communication links is optional and is not included in some embodiments.

User controls section 1230 provides one or more user controls for controlling the information displayed on the application execution map. Examples of user controls include dropdown lists, filters, radio buttons, check boxes, buttons, and the like. There can be controls for zooming in and out, panning, or both. There can be a communications link toggle control that allows the user to toggle the display of the communication links, i.e., to show or hide the communication links. As a specific example, there may be a drop-down list of applications which allows the user to select a specific application to map. Upon selection of the specific application, the mapping tool builds and displays an application execution map showing the nodes that are participating in executing the selected application. Another example of a user control includes a filter. The filter can be used to show or hide specific nodes. Filtering may be based on an IP address associated with a node, type of node (e.g., server node versus client node), or both.

For example, when client nodes are added to the map there could potentially be a very large number of clients. It may not be desirable to display all the clients on the map because such a display may appear very cluttered. A map containing a large number of nodes may be displayed using aggregation on some nodes, and allowing the user to expand the parts that are of interest. For example, all nodes participating in an application that live in a given data center could initially be represented as a single node on the application map, and when/if the user chooses to, expanded to show individual nodes (aggregation could be explicit by configuration for some IP address ranges or done automatically by common network address prefix, for example same first 3 bytes of an IPv4 address). Aggregation could be triggered if the application map is large enough, so that small maps are displayed node by node.

A user may select dynamically what to display or not on the map. For example, as discussed above, seeing all client nodes might or might not be of interest, so this is something that the user can easily trigger on/off or toggle. In other words, application nodes may be typed (e.g., "client" being different than "server" or "DB," etc). Some nodes may be displayed on the map even if they are not currently participating, for example a database known to be accessed by the application (even if it was not recently accessed by the application). Thus, some nodes might have a special status such as "display when not part of the application" that is configurable at the node agent level or at the application or map level.

Node details section 1235 can provide details about a specific node or machine that is participating in executing the application. The details can include configuration information, operating system version, memory usage, processor usage, disk space or disk usage, or any computer parameter or combination of parameters. A detail such as memory usage may be displayed in a graphical form such as via a bar chart or pie chart.

The application execution map may be an interactive map. For example, the user may be able to select via a pointing device a particular node and the details about the particular node will be displayed in the node details section. The node details section may be implemented as a pop-up dialog box, as a window separate from the window displaying the application execution map, or as a frame within the window displaying the application execution map.

Figure 13:
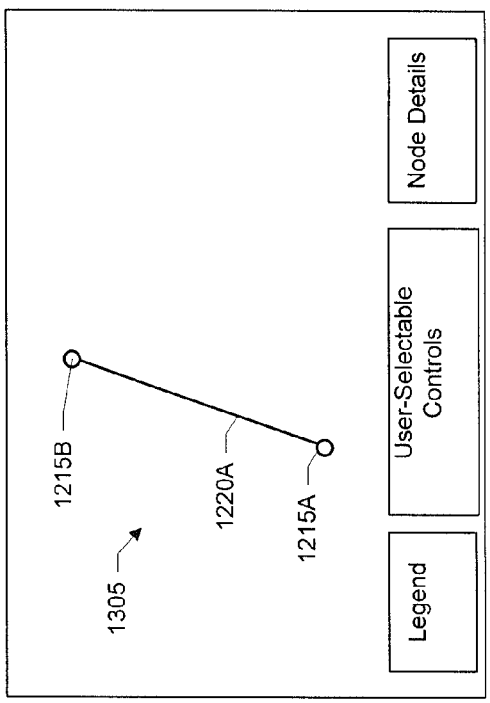
FIG. 13 shows a graphical user interface displaying an embodiment of an updated application execution map.

FIG. 13 shows an updated view 1305 of the application execution map shown in FIG. 12. In this example, the system has determined that one of the nodes (e.g., third node 1215C) is no longer participating in executing the application. Thus, in this specific implementation, the third node is omitted or not visible on the updated application execution map.

In a specific implementation, there is a "real-time" use as described in application. In another specific implementation, there is a historical view. The historical view includes an animated map of how an application behaved in the past such as in the past week. Arriving and departing nodes may be visually emphasized by, for example, points popping up and disappearing during the animation. The user controls section may include video controls such as play, forward, rewind, and stop buttons. In this specific implementation, a feature of the application execution map includes providing an animated application execution map. This allows the user to graphically see how the participating and non-participating nodes change over time. Such an application execution map may be referred to as an application execution motion chart.

Figure 15:
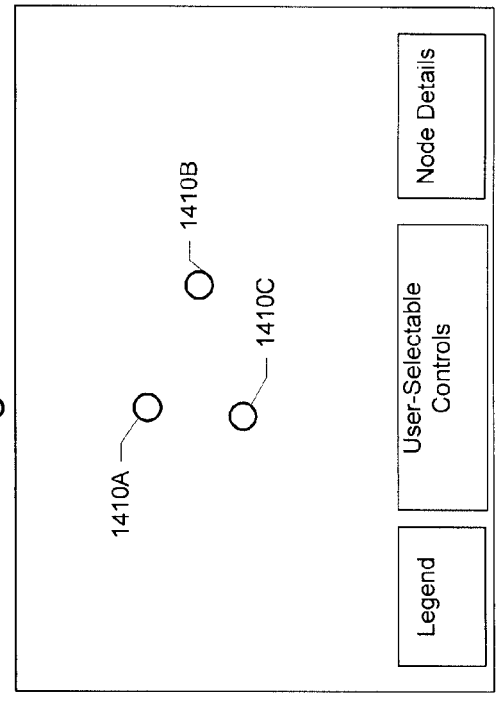
FIG. 15 shows a graphical user interface displaying another embodiment of an updated application execution map.
Figure 14:
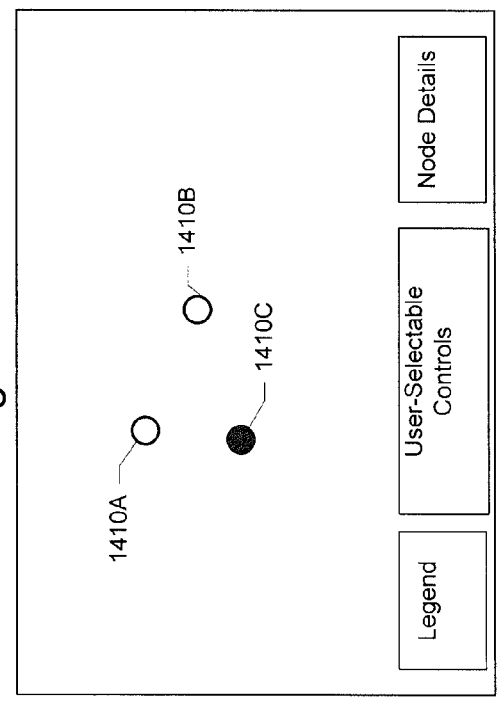
FIG. 14 shows a graphical user interface displaying another embodiment of an application execution map.

FIGS. 14-15 show another specific implementation of an application execution map. In this specific implementation, a visual indicator such as a color associated with a node is used to indicate whether or not a node is participating in executing an application. This specific implementation also shows an example where the communication links are hidden or not visible. In FIG. 14, first and second nodes 1410A and 1410B are displayed using a first color as indicated by the unfilled circles. A third node 1410C is displayed using a second color, different from the first color, as indicated by the filled circle. The first color can indicate that the node is a participating node. The second color can indicate that the node is a non-participating node.

FIG. 15 shows an example of the application execution map in FIG. 14 having been updated. As shown in this example, the color of third node 1410C has changed from the first color to the second color as indicated by the unfilled circle to indicate that third node 1410C is now currently participating in executing the application. The map displayed to the user may graphically convey some of the information by using for example different colors for different "freshness" degrees of the information. A node that was determined to be participating in the application at some point in the past and not since could be drawn using a different color or shade from nodes found to participate more recently.

For example, an application execution map may include first and second nodes where each node has been determined to be participating in executing the application. Thus, both nodes are displayed in the same color. However, one of the nodes (e.g., first node) may be displayed in a different shade than the other node (e.g., second node) to indicate that the first node has been found to be participating in executing the application more recently than the second node. For example, the first node may be colored dark red and the second node may be colored light red.

In the examples shown in FIGS. 14-15, different colors are used as visual indicators to indicate whether or not a node is participating in executing the application. It should be appreciated, however, that anything that visually distinguishes one node from another node may be used. For example, whether or not a node is participating in executing the application may be indicated by a shape (e.g., square, box, rectangle, or circle), pattern (e.g., checkerboard, solid, or stripes), size, level of saturation (e.g., dark red or light red), color gradient, animation (e.g., nodes that blink are participating in executing the application and nodes that are not blinking or steady are not participating in executing the application), and so forth.

Further, there can be different types of visual indicators to show other information. For example, a type of visual indicator associated with a node may indicate a level of confidence related to whether the node is a participating or non-participating node (see above confidence rating discussion). For example, nodes displayed in green or represented as squares may indicate a high-degree of confidence that the nodes are participating nodes. Nodes displayed in red or represented as triangles may indicate a low-degree of confidence that the nodes are participating nodes.

The application execution maps shown in FIGS. 12-15 may be referred to as abstract maps or graphs. Some nodes could have as additional data/attributes their geographical information when available. Such information may be shown through a "properties" dialog box or mouse over information. FIGS. 16-19 show some other examples of application execution maps that may be displayed based on node geographical information. These examples are similar to the application execution maps shown in FIGS. 12-15, however, in FIGS. 16-19, the position or layout of the node corresponds to their geographic location.

Figure 16:
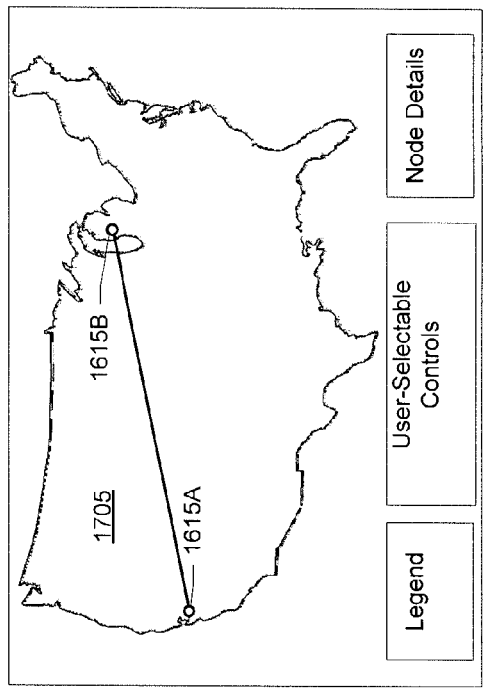
FIG. 16 shows a graphical user interface displaying an embodiment of an application execution map overlaid on a geographical map.

Specifically, FIG. 16 shows a view of an application execution map 1605 superimposed over a geographical map or outline of the United States 1610. As shown in FIG. 16, a first node 1615A is located in California, a second node 1615B is located in Michigan, and a third node 1615C is located in Texas.

In this example, the geographical map or outline is that of the United States. It should be appreciated, however, that the application execution map may instead be superimposed over other geographical regions such as France, China, India, or a world map, and so forth. For example, if the participating nodes happen to be in multiple countries around the world, the application execution map may be superimposed over a world map.

Depending factors such as the location of the nodes, the application execution map may be imposed over a building map or a campus map. For example, if the nodes are local to each other, such as in the same building, the application execution map may be superimposed over a building map. The building map may identify the different floors and rooms of a building. A geographic location of a node may be based on a particular floor, room, or both of a building. A campus map may identify the different buildings in which a node may be found.

Figure 17:
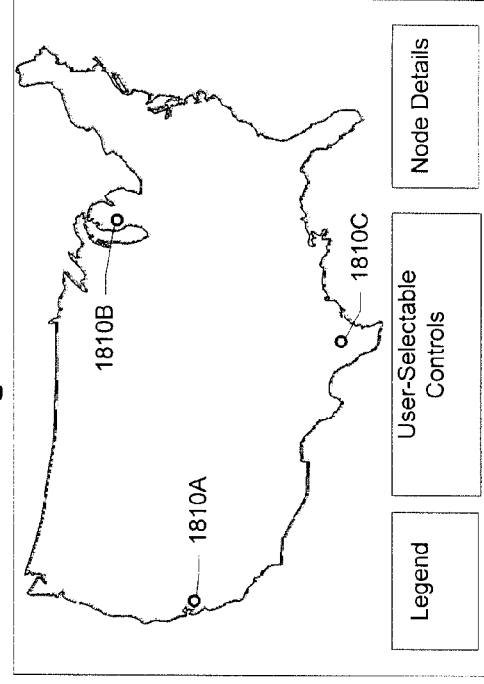
FIG. 17 shows a graphical user interface displaying an embodiment of an updated application execution map overlaid on the geographical map.

FIG. 17 shows an updated view 1705 of the map shown in FIG. 16. In this view, third node 1615C is omitted from the updated map to indicate that the third node is no longer participating in executing the application.

Figure 18:
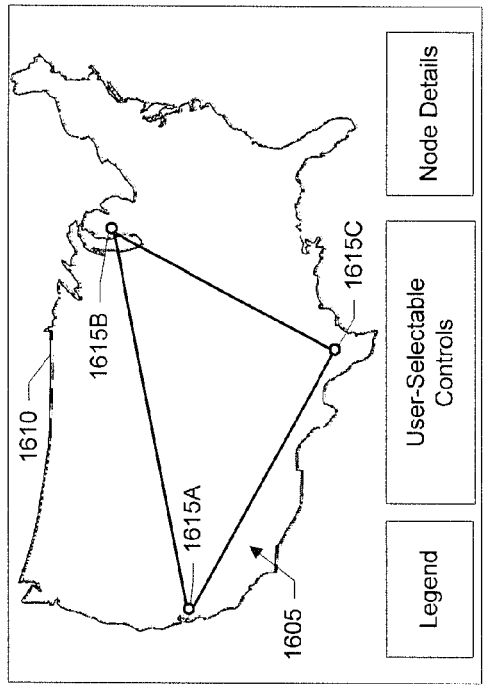
FIG. 18 shows a graphical user interface displaying another embodiment of an application execution map overlaid on a geographical map.
Figure 19:
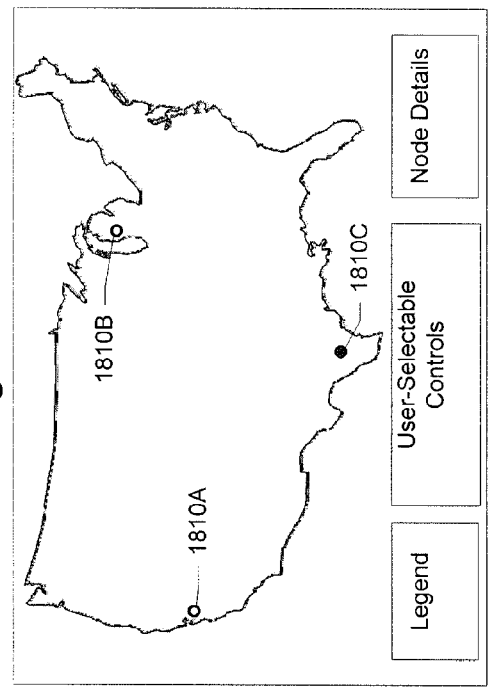
FIG. 19 shows a graphical user interface displaying another embodiment of an updated application execution map overlaid on the geographical map.

FIGS. 18-19 show an example of an application execution map superimposed over a geographical map where a specific visual indicator, such as a color is used to indicate whether or not a node is participating in executing an application. For example, in FIG. 18, first and second nodes 1810A and B are displayed using a first color as indicated by the unfilled circles to indicate that the nodes are participating in executing the application. A third node 1810C is displayed using a second color as indicated by the filled circle to indicate that the third node is not participating in executing the application. FIG. 19 shows the application execution map of FIG. 18 having been updated. As shown in FIG. 19, third node 1810C is displayed in the first color as indicated by the unfilled circle to indicate that the third node is now participating in executing the application.

An application execution map can be useful for companies that develop and deliver complex systems and applications that involve a heavily distributed infrastructure, and companies that put a strong emphasis on Cloud computing. In these environments, applications are increasingly distributed with a higher dynamism in the distribution (nodes being frequently added and removed from the system). The flexibility provided by Cloud computing and distributed systems come with a price: complexity. It is desirable that customers be assisted to reduce that perceived complexity.

Providing a synthetic and easy to understand view of a complex configuration is desirable during development, deployment and operation. Such a view tremendously simplifies maintenance issues, allows identifying potential issues before any harm (or downtime) is done, helps in debugging distributed applications, judging and measuring scalability, addressing security concerns (what runs where, who accesses what), etc.

Such a tool helps to reduce Total Cost of Ownership and increase customer "delightment." Historical monitoring data can also serve to understand how use patterns of a system change over time (how the system scales, when does the load appear, etc).

The application execution mapping feature can provide a monitoring and mapping infrastructure that is easily integrated into existing systems and applications in the stacks being deployed. A company's systems and software can be updated to support the monitoring systems. A company's Cloud offering can also integrate such mechanisms (and offer related services) to simplify Cloud deployment for hosted 3rd party applications and make itself a preferred choice for Cloud deployment. Distributed application monitoring and mapping could be offered as a service and be itself hosted in the Cloud. An application execution mapping system may be deployed in a private cloud, public cloud, community cloud, or hybrid cloud. In a specific implementation, an application execution map is displayed within a cloud services management console which may further include information on cloud resource utilization. These features are further described in U.S. patent application Ser. Nos. 13/247,505 and 13/245,390, which are incorporated by reference along with all other references cited in this application.

As discussed, such maps can be used during application development and debug to get a better picture of where the application is executing. It should be appreciated that map usage is not limited to the cloud environment, and when an application executes inside and outside the cloud, the map can show all the nodes. In a specific embodiment, implementation is done by network sniffing, installation of agents on participating machines, by application instrumentation, or combinations of these. In other words, the methods can be combined as different environments have different constraints of what is possible. In a specific embodiment, there is a centralizing infrastructure to gather the data sent in by the various agents. A map centralization service can be offered in the cloud or elsewhere.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
providing a plurality of monitoring agents to monitor an application capable of executing on a plurality of computing nodes;
receiving from one or more monitoring agents information identifying one or more computing nodes which are participating in executing the application;
displaying on an electronic screen a map comprising an icon for each of the one or more computing nodes participating in executing the application;
after the displaying on an electronic screen a map, determining that a first computing node of the one or more computing nodes is no longer participating in executing the application;
updating the map to indicate that the first computing node is no longer participating in executing the application; and
displaying the updated map on the electronic screen.

2. The method of claim 1 wherein the icon for the first computing node is displayed in a first color on the map to indicate that the first computing node is participating in executing the application, and
wherein the icon for the first computing node is displayed in a second color, different from the first color, on the updated map to indicate that the first computing node is no longer participating in executing the application.

3. The method of claim 1 wherein the icon for the first computing node is displayed on the map to indicate that the first computing node is participating in executing the application, and
wherein the icon for the first computing node is omitted on the updated map to indicate that the first computing node is no longer participating in executing the application.

4. The method of claim 1 wherein the determining that a first computing node is no longer participating in executing the application comprises:
calculating a difference between a time associated with the first computing node executing the application and a current time; and
determining that the difference is greater than a threshold duration.

5. The method of claim 1 wherein the map comprises a line from one of the one or more computing nodes to another of the one or more computing nodes participating in executing the application to indicate a communication link between the one and the other computing node.

6. The method of claim 1 wherein the map comprises an icon for a client computer indicating that the client computer is connected to one of the one or more computing nodes and thereby participating in executing the application, and wherein the client computer does not comprise a monitoring agent.

7. The method of claim 1 wherein the received information comprises an Internet Protocol (IP) address for each of the one or more computing nodes.

8. The method of claim 1 wherein the plurality of computing nodes comprises physical machines, virtual machines, or both.

9. The method of claim 1 comprising:
displaying resource usage of at least one of the one or more computing nodes participating in executing the application.

10. A method comprising:
providing a plurality of monitoring agents to monitor an application capable of executing on a plurality of computing nodes;

receiving from one or more monitoring agents information identifying one or more computing nodes which are participating in executing the application, the one or more computing nodes not including a first computing node, wherein the first computing node is not participating in executing the application;

displaying on an electronic screen a map comprising an icon for each of the one or more computing nodes participating in executing the application;

after the displaying on an electronic screen a map, receiving information from a first monitoring agent indicating that the first computing node is participating in executing the application;

updating the map to indicate that the first computing node is participating in executing the application; and displaying the updated map on the electronic screen.

11. The method of claim 10 comprising:

after the displaying on an electronic screen a map, determining that a second computing node of the one or more computing nodes is no longer participating in executing the application; and updating the map to indicate that the second computing node is no longer participating in executing the application.

12. The method of claim 10, further comprises displaying on the electronic screen the map comprising the icon for each of the one or more computing nodes participating in executing the application and the first computing node, wherein the icon for the first computing node is displayed in a first color on the map to indicate that the first computing node is not participating in executing the application, and wherein the icon for the first computing node is displayed in a second color, different from the first color, on the updated map to indicate that the first computing node is participating in executing the application.

13. The method of claim 10 wherein the updated map comprises an icon for the first computing node to indicate that the first computing node is participating in executing the application, and wherein the icon for the first computing node is omitted from the map to indicate that the first computing node is not participating in executing the application.

14. A computer program product, comprising a non-transitory computer-readable medium having a computer-readable program code embodied therein, the computer-readable program code adapted to be executed by one or more processors to:

provide a plurality of monitoring agents to monitor an application executing on a plurality of computing nodes;

receive from one or more monitoring agents information identifying one or more computing nodes which are participating in executing the application;

display on an electronic screen a map comprising an icon for each of the one or more computing nodes participating in executing the application;

after the displaying on an electronic screen a map, determine that a first computing node of the one or more computing nodes is no longer participating in executing the application;

update the map to indicate that the first computing node is no longer participating in executing the application; and display the updated map on the electronic screen.

15. The computer program product of claim 14 wherein the icon for the first computing node is displayed in a first color on the map to indicate that the first computing node is participating in executing the application, and wherein the icon for the first computing node is displayed in a second color, different from the first color, on the updated map to indicate that the first computing node is no longer participating in executing the application.

16. The computer program product of claim 14 wherein the icon for the first computing node is displayed on the map to indicate that the first computing node is participating in executing the application, and wherein the icon for the first computing node is omitted on the updated map to indicate that the first computing node is no longer participating in executing the application.

17. A system for displaying an application execution map, the system comprising:

a processor-based database management system executed on a computer system, the system having one or more processors and a non-transitory computer readable medium storing a plurality of instructions, which when executed, cause the one or more processors to:

provide a plurality of monitoring agents to monitor an application executing on a plurality of computing nodes;

receive from one or more monitoring agents information identifying one or more computing nodes which are participating in executing the application;

display on an electronic screen a map comprising an icon for each of the one or more computing nodes participating in executing the application;

after the displaying on an electronic screen a map, determine that a first computing node of the one or more computing nodes is no longer participating in executing the application;

update the map to indicate that the first computing node is no longer participating in executing the application; and display the updated map on the electronic screen.

18. The system of claim 17 wherein the processor-based database management system is configured to:

display the icon for the first computing node in a first color on the map to indicate that the first computing node is participating in executing the application, and display the icon for the first computing node in a second color, different from the first color, on the updated map to indicate that the first computing node is no longer participating in executing the application.

19. The system of claim 17 wherein the processor-based database management system is configured to:

display the icon for the first computing node on the map to indicate that the first computing node is participating in executing the application, wherein the icon for the first computing node is omitted on the updated map to indicate that the first computing node is no longer participating in executing the application.

20. The system of claim 17 wherein the processor-based database management system is configured to display the map on a geographical map.

* * * * *